(12) United States Patent
Takimoto et al.

(10) Patent No.: US 8,036,268 B2
(45) Date of Patent: Oct. 11, 2011

(54) MOVING IMAGE ENCODING APPARATUS, MOVING IMAGE ENCODING METHOD, AND VIDEO DEVICE

(75) Inventors: Takahiro Takimoto, Sayama (JP); Tomoya Kodama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/816,936

(22) Filed: Jun. 16, 2010

(65) Prior Publication Data

US 2011/0002382 A1 Jan. 6, 2011

(30) Foreign Application Priority Data

Jul. 2, 2009 (JP) .................................. 2009-157959

(51) Int. Cl.
*H04N 7/12* (2006.01)
(52) U.S. Cl. .............................. 375/240.03; 375/240.12
(58) Field of Classification Search .................. 375/240, 375/240.01, 240.03, 240.12
See application file for complete search history.

(56) References Cited

U.S. PATENT DOCUMENTS

| | | | |
|---|---|---|---|
| 5,661,523 A | 8/1997 | Yamane | |
| 6,915,018 B2 | 7/2005 | Tajime | |
| 7,099,389 B1 | 8/2006 | Yu et al. | |
| 2001/0006562 A1 | 7/2001 | Tajime | |

FOREIGN PATENT DOCUMENTS

| | | |
|---|---|---|
| JP | 7-288810 | 10/1995 |
| JP | 2001-186517 | 7/2001 |
| JP | 2005-137023 | 5/2005 |
| JP | 2006-33014 | 2/2006 |
| JP | 2006-74347 | 3/2006 |
| JP | 2006-509444 | 3/2006 |
| JP | 2009-005417 | 1/2009 |

OTHER PUBLICATIONS

Japanese Patent Application No. 2009-157959; Notice of Reasons for Rejection; Mailed Jan. 11, 2011 (English translation).

*Primary Examiner* — Allen Wong
(74) *Attorney, Agent, or Firm* — Blakely, Sokoloff, Taylor & Zafman LLP

(57) ABSTRACT

According to one embodiment, a moving image/picture encoding apparatus of an embodiment comprises an encoded information acquisition module, an encoding complexity calculation module, an encoding complexity conversion module, and a transcode module. The encoded information acquisition module reads MPEG header information from the input stream to acquire information on a quantization scale, generated bits and a picture type for each frame. The encoding complexity calculation module uses the acquired information to calculate, for each of the frames, encoding complexity represented in a form of the product of the quantization scale and the generated bits. The encoding complexity conversion module uses a linear function prepared for each of the picture types to convert the calculated encoding complexity into encoding complexity of H. 264/AVC. The transcode module uses the converted encoding complexity of H. 264/AVC to transcode the input stream into the output stream.

5 Claims, 7 Drawing Sheets

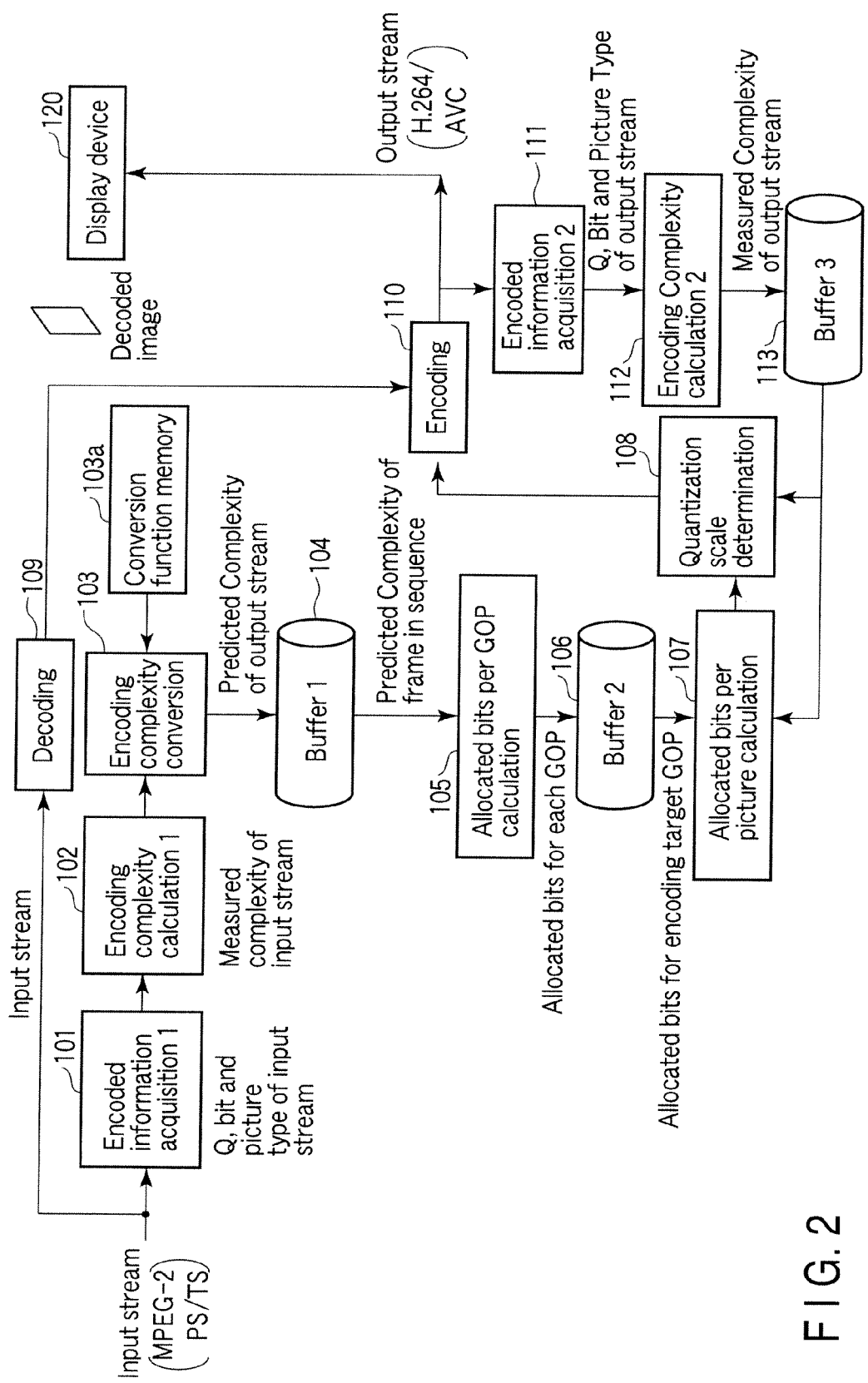
F I G. 2

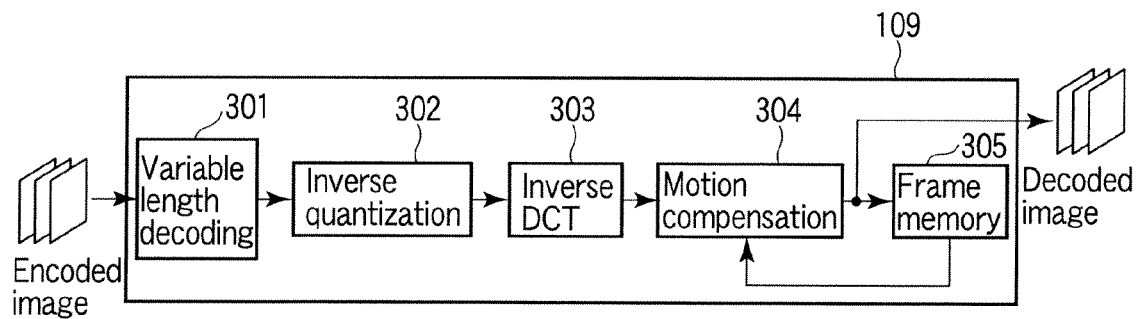
F I G. 3
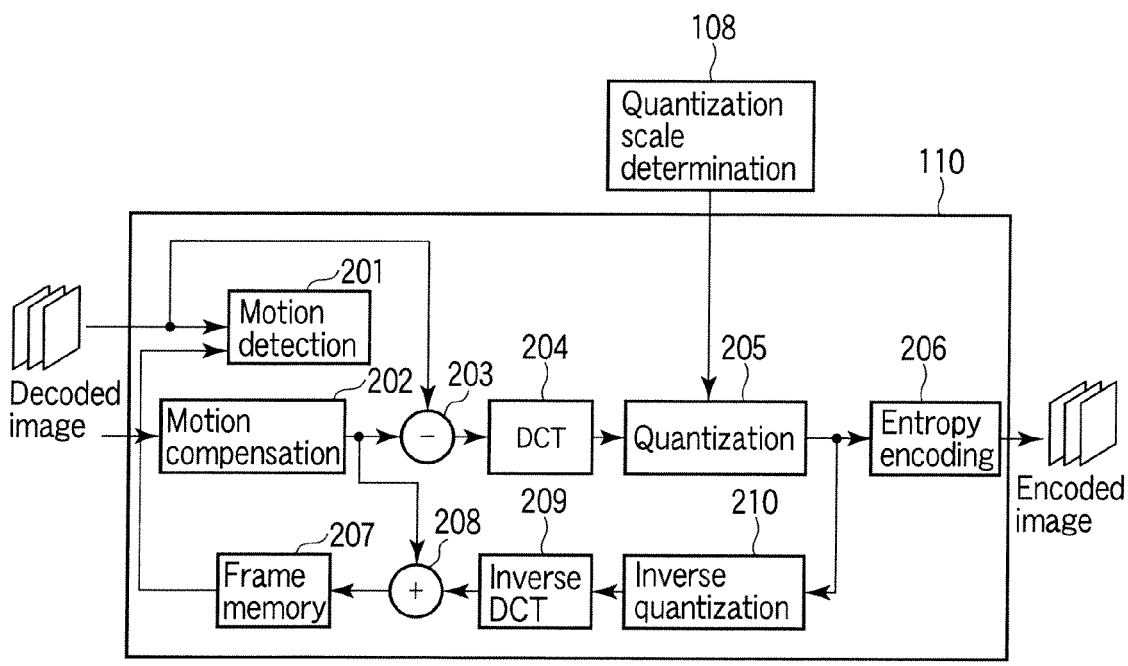
F I G. 4

| | I | P | B | GOP |
|---|---|---|---|---|
| Correlation coefficient | 0.85 | 0.78 | 0.81 | 0.91 |

MOVING IMAGE ENCODING APPARATUS, MOVING IMAGE ENCODING METHOD, AND VIDEO DEVICE

CROSS-REFERENCE TO RELATED APPLICATIONS

This application is based upon and claims the benefit of priority from Japanese Patent Application No. 2009-157959, filed Jul. 2, 2009; the entire contents of which are incorporated herein by reference.

FIELD

Embodiments described herein relate generally to a moving image (or moving picture) encoding apparatus and a moving image (or moving picture) encoding method for transcoding a first encoding stream (e.g., an MPEG-2 stream) into a second encoding stream (e.g., an H. 264/MPEG-4 AVC stream), and also relates to a video device for handling pictures of the transcoded stream.

BACKGROUND

In fields where digital moving image information is handled, the information is compressed. One typical compression technique is MPEG (e.g., MPEG-1, MPEG-2, H. 264/MPEG-4 AVC). The MPEG-1 has been used in old-generation package media (e.g., a video CD). In the meantime, the MPEG-2 is used in digital television broadcasting or current-generation video package media (e.g., a DVD). Moreover, the H. 264/MPEG-4 AVC or the like is used to more efficiently compress high-quality digital moving image information such as high-definition pictures.

The MPEG-2 is used for the high-definition pictures of, for example, a digital television broadcast, but the compression efficiency of the MPEG-2 is becoming less than sufficient. For example, when high-definition pictures (the bit rate is a fixed rate of 24 Mbps) of a satellite digital broadcast are to be recorded into a single-sided single-layer DVD-R disc having a capacity of 4.7 GB, little more than twenty minutes of pictures can only be recorded. However, if the high-definition pictures are re-encoded by, for example, the H. 264/MPEG-4 AVC and thus converted (transcoded) into new high-definition pictures (the bit rate is a variable rate of about 4 Mbps in average), about two hours of high-definition pictures of the digital television broadcast can be recorded in the 4.7 GB disc.

Under these circumstances, development is proceeding in moving image encoding techniques for transcoding a first encoding stream (e.g., an MPEG-2 stream) into a second encoding stream (e.g., an H. 264/MPEG-4 AVC stream) (see Jpn. Pat. Appln. KOKAI Publication No. 2006-33014).

In Jpn. Pat. Appln. KOKAI Publication No. 2006-33014, transitions in the complexity of encoding and the amount of generated bits are regarded as equal in order to achieve adaptive bits allocation. That is, if a quantization parameter remains the same throughout a sequence, the transition in the generated bits of an input image stream can be regarded as the same as the transition in the encoding complexity throughout the sequence, and bits can be allocated in accordance with the encoding complexity for each frame. However, in fixed bit rate control which is used in, for example, the digital television broadcasting, the quantization parameter is changed to maintain a constant bit rate, so that the transition in the generated bits cannot always be regarded as the same as the transition in the encoding complexity. That is, it is difficult to achieve the adaptive bits allocation corresponding to the contents of an input image stream.

BRIEF DESCRIPTION OF THE DRAWINGS

FIG. 2 is an exemplary diagram explaining a specific configuration of the moving image encoding apparatus according to one embodiment;

FIG. 3 is an exemplary diagram explaining details of a decoding unit 109 in the configuration of FIG. 2;

FIG. 4 is an exemplary diagram explaining details of an encoding unit 110 in the configuration of FIG. 2;

DETAILED DESCRIPTION

In the following description the term "unit" is used to have meaning of a "unit or module". Further, the term "image" is used to encompass meaning of "moving/still images or moving/still pictures". Also, the "image" may include "picture-in-pictures" or "images in over-lapped windows". The term "num of bits" may cover a code amount of one or more bits.

In general, according to an embodiment of a moving image encoding apparatus, an MPEG-encoded input stream (e.g., a program stream (PS) of MPEG-1, -2 or a transport stream (TS) of MPEG-2) is transcoded into an output stream of H. 264/MPEG-4 AVC. This moving image encoding apparatus comprises an encoded information acquisition module (101), an encoding complexity calculation module (102), an encoding complexity conversion module (103, 103a), and a transcode module (104 to 113). Here, the encoded information acquisition module (101) reads header information from the input stream to acquire information on a quantization scale, a generated bits and a picture type for each frame. The encoding complexity calculation module (102) uses the information acquired in the encoded information acquisition module (101) to calculate, for each of the frames, encoding complexity represented in the form of the product of the quantization scale and the generated code amount (generated bits×quantization scale).

The encoding complexity conversion module (103, 103a) uses a predetermined function prepared for each of the picture types (e.g., direct functions illustrated in FIG. 6 to FIG. 8) to convert the encoding complexity (Xmpeg2) calculated by the encoding complexity calculation module (102) into encoding complexity (Xh. 264) of, for example, H. 264/MPEG-4 AVC. Then, the transcode module (104 to 113) uses the encoding complexity (Xh. 264) of, for example, the H. 264/MPEG-4 AVC converted by the encoding complexity conversion module (103, 103a) to re-encode (transcode) the input stream into the output stream.

When the embodiment is reduced to practice, more adaptive bits allocation can be achieved, and image quality deterioration associated with the transcoding can be suppressed.

Figure 1:
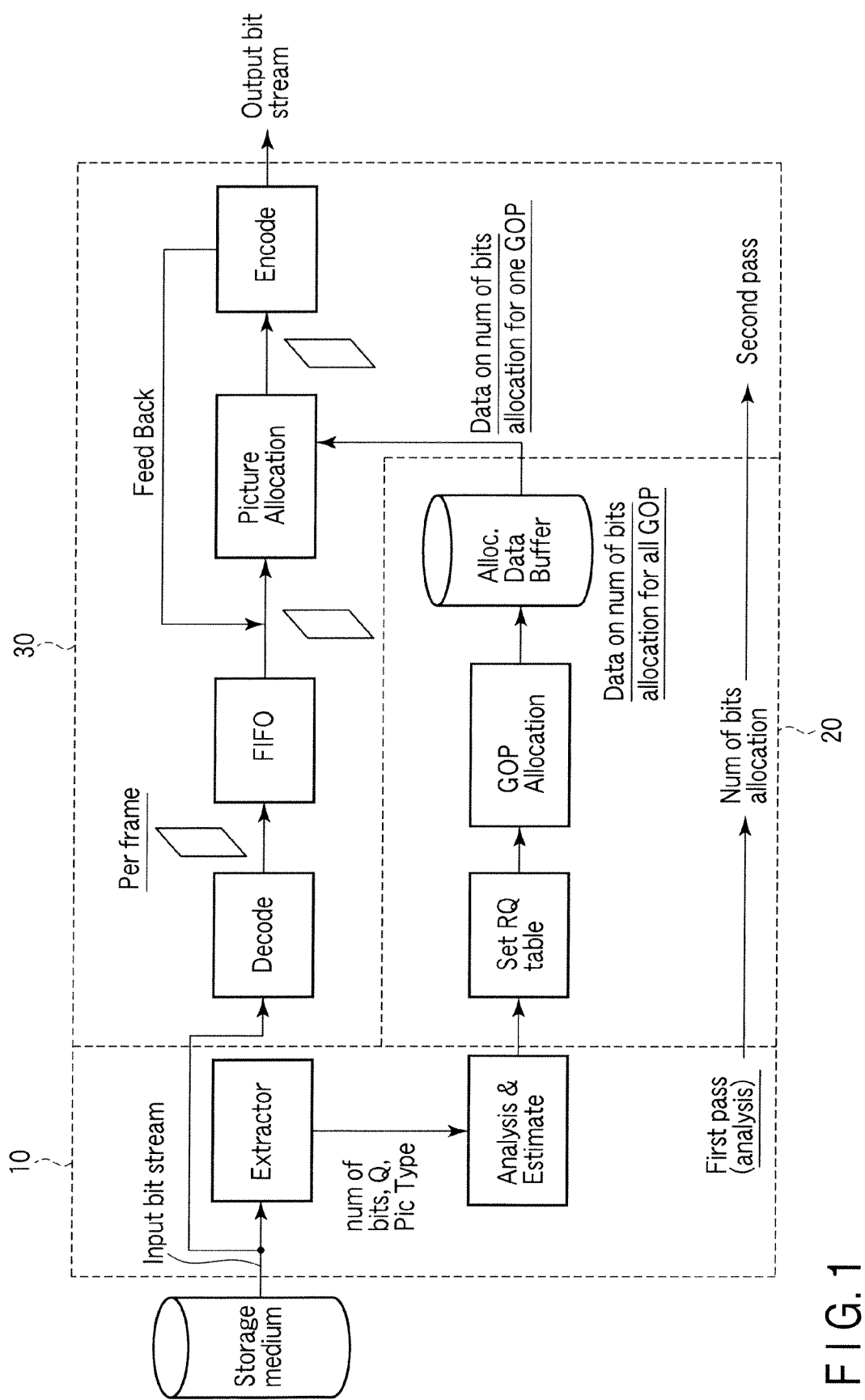
FIG. 1 is an exemplary conceptual diagram of a moving image encoding apparatus according to one embodiment.

Various embodiments will hereinafter be described with reference to the drawings. FIG. 1 is an exemplary conceptual diagram of a moving image encoding apparatus according to one embodiment. A bit stream extracted from a recording medium (e.g., a DVD-R, -RW, -RAM or a BD-R, -RW or a high-capacity memory card in which a digital television broadcast program is recorded) is provided to the moving image encoding apparatus in FIG. 1 as an input stream. An input stream analyzing unit 10 of this apparatus acquires, as a first-pass analysis, encoded information (information on, for example, a quantization scale, a generated bit or bits and a picture type for each frame) from the header of the input stream (e.g., a PS or TS of MPEG-2), and analyzes and evaluates the acquired information. The evaluated analytic result is sent to an encoding bits allocation unit 20.

In the encoding bits allocation unit 20, a quantization table referred to during transcoding is set from the first-pass analytic result, and bit/bits to be allocated to each GOP (or to each predetermined encoding target section, e.g. 15 frames) is/are determined from the set contents of the table, and then allocated bits data for all GOPs is temporarily buffered. The allocated bits data is sent to a decoding/encoding unit 30 per GOP (or per predetermined section for, for example, 15 frames) from the buffered data.

In the decoding/encoding unit 30, as second-pass processing, the input stream is decoded for each frame, and a decoding result is temporarily stored in a FIFO buffer. Decoded image streams are extracted from the FIFO buffer in the order of storing. The extracted image streams are re-encoded on a quantization scale based on per-picture allocated bits. Here, the per-picture allocated bits are calculated from the allocated bits (or data on the num of bits allocation) for one GOP (or for a predetermined section for, for example, 15 frames) sent from the encoding amount allocation unit 20 (a specific example of calculation will be described later). The image streams re-encoded in the decoding/encoding unit 30 are sent to the outside of the apparatus as an output bit stream.

FIG. 2 is an exemplary diagram explaining a specific configuration of the moving image encoding apparatus according to one embodiment. In the configuration in FIG. 2, 101 and 102 correspond to the input stream analyzing unit 10 in FIG. 1, 103 to 106 correspond to the encoding bits allocation unit 20, and 107 to 113 correspond to the decoding/encoding unit 30.

An MPEG-encoded input stream (e.g., a PS/TS of MPEG-2) is input to an encoded information acquisition unit (encoded information acquisition module) 101. The encoded information acquisition unit 101 reads MPEG header information from the input stream to acquire information on a quantization scale (Q), generated bits (bit) and a picture type for each frame. The acquired information is input to an encoding complexity calculation unit (encoding complexity calculation module) 102. The encoding complexity calculation unit 102 uses the input acquired information to calculate, for each frame in a sequence (the whole MPEG-encoded moving image), encoding complexity represented in the form of the product of the quantization scale and the generated bits (generated bits×quantization scale). Specifically, the encoding complexity calculation unit 102 uses a relation in Equation 1 described later to calculate encoding complexity (Xmpeg2) of the input stream from the bits (S) of the frame and the average quantization scale (Q) of the frame. The calculated encoding complexity (Xmpeg2) is input to an encoding complexity conversion unit 103.

A conversion function memory 103a is connected to the encoding complexity conversion unit 103. In this conversion function memory 103a, a function for converting the encoding complexity (Xmpeg2) calculated for the input stream into new encoding complexity (Xh. 264) is previously stored for each picture type (e.g., an I-picture, a P-picture or a B-picture) (a specific example of the function will be described later with reference to FIG. 6 to FIG. 8). The encoding complexity conversion unit 103 uses the function stored in the conversion function memory 103a to convert the encoding complexity (Xmpeg2) calculated for the input stream into the new encoding complexity (Xh. 264). The encoding complexity conversion unit 103 and the conversion function memory 103a constitute an encoding complexity calculation module.

The new encoding complexity (Xh. 264) obtained by the functional conversion by the encoding complexity conversion unit 103 predicts or estimates encoding complexity for the output stream after the transcoding of the input stream. This predicted encoding complexity (Xh. 264) and encoding complexity for an actual output stream substantially have one-to-one correspondence between them (an example of this correspondence will be described later with reference to FIG. 9).

The new encoding complexity (Xh. 264) obtained by the functional conversion by the encoding complexity conversion unit 103, that is, the predicted encoding complexity (Xh. 264) substantially corresponding one-to-one to the encoding complexity for the actual output stream is temporarily stored in a buffer 104 as predicted encoding complexity for a frame in the sequence. The predicted encoding complexity (Xh. 264) extracted from the buffer 104 is input to an allocated bits per GOP calculation unit 105.

In the allocated bits per GOP calculation unit 105, a num of bits or code amounts (Sall) to be provided to all the frames in the sequence are calculated from a predetermined bit rate, a frame rate and the number of all frames (M) in the sequence in accordance with the relation in Equation 2 described later. Then, the calculated num of bits or the calculated code amount (Sall) and the predicted encoding complexity (Xh. 264) input from the buffer 104 are used to calculate an allocated bits for each GOP (or for a predetermined section for, for example, 15 frames) in accordance with a relation in Equation 3 described later.

The calculated allocated bits for each GOP is temporarily stored in a buffer 106. From the buffer 106, allocated bits for an encoding target GOP (or for a predetermined encoding target section) targeted for transcoding is extracted. The extracted allocated bits of the encoding target GOP is input to allocated bits per picture calculation unit 107.

In the allocated bits per picture calculation unit 107, allocated bits per picture is calculated for a target encoding frame in the encoding target GOP (or a predetermined encoding target section) in accordance with the relation in Equation 4 described later. The calculated allocated bits per picture are input to a quantization scale determining unit 108.

In the quantization scale determining unit 108, the input allocated bits per picture and predicted encoding complexity (corresponding to the new encoding complexity (Xh. 264) obtained by the functional conversion by the encoding complexity conversion unit 103) is used to determine a quantization scale for a transcoding target image in accordance with the relation in Equation 5 described later.

On the other hand, the MPEG-encoded input stream (MPEG-2) is decoded in a decoding unit (MPEG-2 decoder) 109, and the decoded image information is transcoded into an output stream of the H. 264/MPEG-4 AVC by an encoding unit (H. 264/MPEG-4 AVC encoder) 110. In this transcoding, the quantization scale determined in the quantization scale determining unit 108 is used.

The output stream transcoded by the encoding unit 110 is sent to an external display device 120 via a digital interface such as an HDMI, or sent to and recorded in an unshown digital recorder (or an audio-visual personal computer).

The output stream transcoded by the encoding unit 110 is further input to an encoded information acquisition unit 111. The encoded information acquisition unit 111 reads H. 264/MPEG-4 AVC header information from the output stream to acquire information on a quantization scale (Q), generated bits (bit) and a picture type for each frame. The acquired information is input to an encoding complexity calculation unit 112. The encoding complexity calculation unit 112 uses the input acquired information to calculate encoding complexity in the same manner as described above. The calculated encoding complexity is temporarily stored in a buffer 113, and the encoding complexity stored buffer 113 will be properly used in the subsequent determination of a quantization and allocated bits per picture.

In the configuration described above, 104 to 113 constitute a transcode module which uses the encoding complexity (Xh. 264) converted by an encoding complexity conversion module (103, 103a) to re-encode (transcode) the input stream into the output stream.

FIG. 3 is an exemplary diagram explaining details of the decoding unit 109 in the configuration of FIG. 2. This decoding unit 109 performs decoding compliant with the MPEG-2, and includes a variable length decoder 301, an inverse quantizer 302, an inverse discrete cosine transformer 303, a motion compensator 304 and a frame memory 305.

FIG. 4 is an exemplary diagram explaining details of the encoding unit 110 in the configuration of FIG. 2. This encoding unit 110 performs encoding compliant with the H. 264/MPEG-4 AVC, and includes a motion detector 201, a motion compensator 202, a subtracter 203, a discrete cosine transformer 204, a quantizer 205, an entropy encoder 206, a frame memory 207, an adder 208, an inverse discrete cosine transformer 209 and an inverse quantizer 210. In this configuration, a discrete cosine transformation coefficient which is an output of the discrete cosine transformer 204 is quantized in the quantizer 205 in accordance with the quantization scale output from the quantization scale determining unit 108 described with reference to FIG. 2. As a result of the quantization corresponding to the quantization scale, control is performed such that an encoded image may have desired bits.

Figure 5:
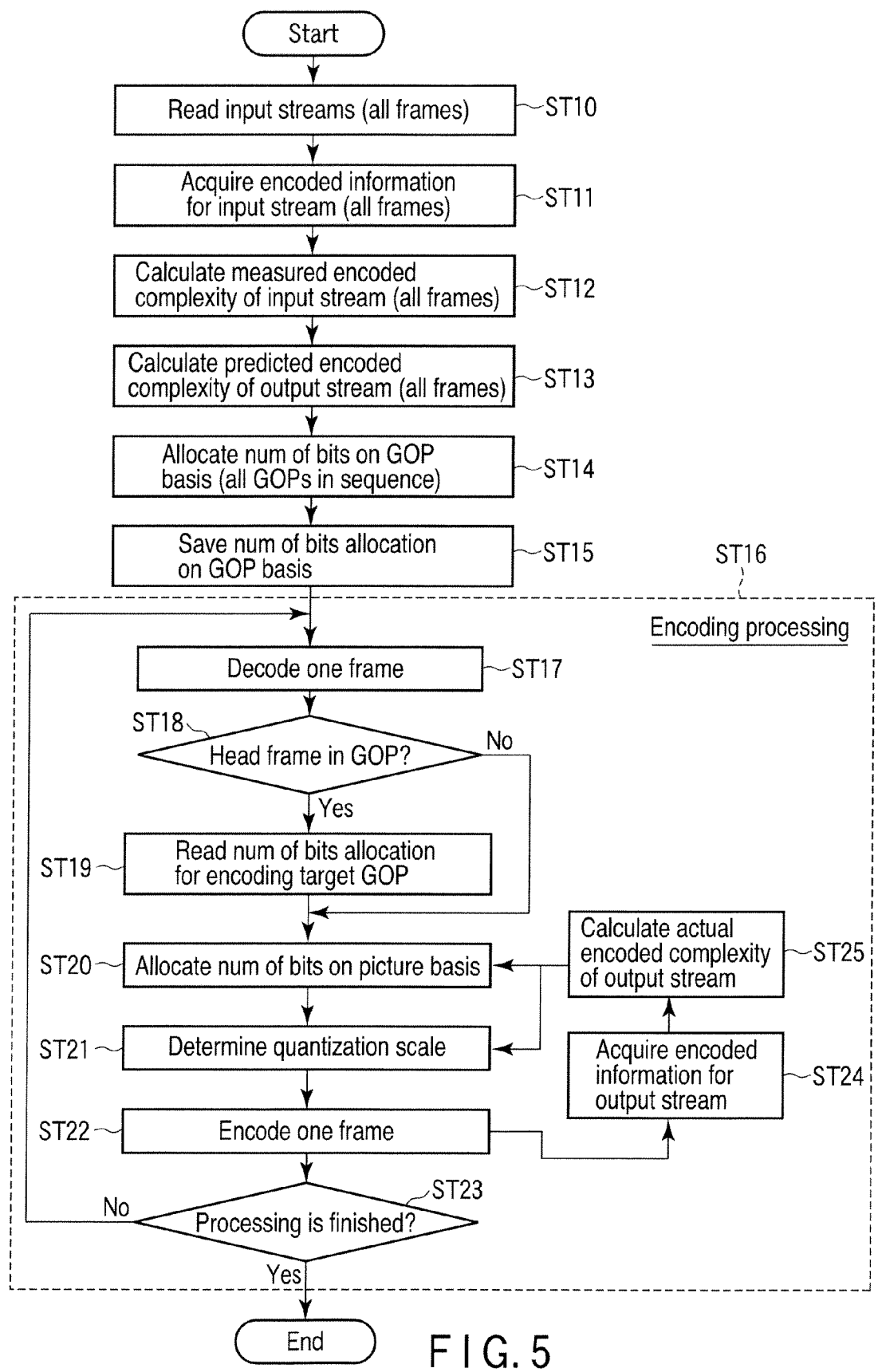
FIG. 5 is an exemplary flowchart explaining one example of the operation of the apparatus in FIG. 2.

FIG. 5 is an exemplary flowchart explaining one example of the operation of the apparatus in FIG. 2. In the example described here, the input stream is an MPEG-2 stream, and the output stream is based on the H. 264/MPEG-4 AVC. First, the input MPEG-2 streams are read for all the frames (ST10). Then, read header information in each of the frames is analyzed to acquire generated bits, a quantization scale and a picture type for each frame in the encoding format of the MPEG-2 stream (ST11).

In regard to the encoded information acquired here, the MPEG-2 bit stream which is an input image stream does not have to be completely deciphered by, for example, variable length decoding (VLD). For example, an initial value of the quantization scale used in the target slice is written in the slice header of the MPEG-2, so that an average quantization scale of the target encoding frame can be approximately calculated by referring to all the slice headers of the frames. Similarly, the bits of a frame can be calculated by counting bits between picture headers.

Then, actual measurement encoding complexity for each frame is calculated in the encoding complexity calculation unit 102 on the basis of the acquired encoded information (ST12). Encoding complexity (X) for each frame is obtained by Equation 1 using the quantization scale (Q) of the frame and the bits (S) of the frame.

$$X = S \times Q^{gi} \qquad \text{(Equation 1)}$$

wherein gi (i=I, P, B) is a fixed value determined for each picture type (the I-picture, the P-picture or the B-picture) and is known to be substantially constant regardless of image as long as the picture type is the same (e.g., see paragraphs 0023 and 0024 in Jpn. Pat. Appln. KOKAI Publication No. 10-023412).

Then, the actual measured encoding complexity in the MPEG-2 format obtained in the processing in ST12 is converted into predicted encoding complexity in the H. 264/MPEG-4 AVC format (ST13). A linear function previously prepared for each picture type can be used for the conversion function here (this conversion function is previously stored in the conversion function memory 103a in FIG. 2).

Figure 6:
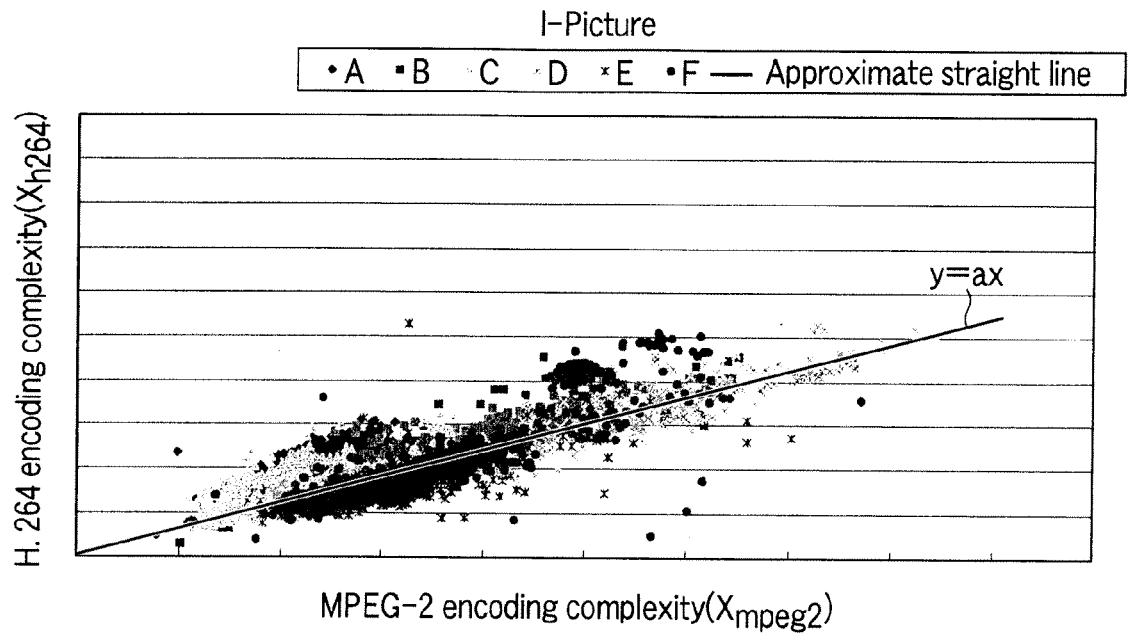
FIG. 6 is an exemplary graph explaining one example of a function used for an MPEG-2/H. 264 conversion of an I-picture in an encoding complexity conversion unit 103 in FIG. 2.

For example, when the picture type is the I-picture, a direct function (or linear function) (y=ax) shown in FIG. 6 can be used as the conversion function. When the picture type is the P-picture, a direct function (y=bx) shown in FIG. 7 can be used as the conversion function. When the picture type is the B-picture, a direct function (y=cx) shown in FIG. 8 can be used as the conversion function. The example in FIG. 8 appears to be slightly nonlinear. In such a case, a nonlinear function may be properly used as the conversion function in accordance with actual conditions. Data on the predicted encoding complexity converted by the conversion function is temporarily stored in the buffer 104 in FIG. 2 for all the frames in the sequence.

Figure 7:
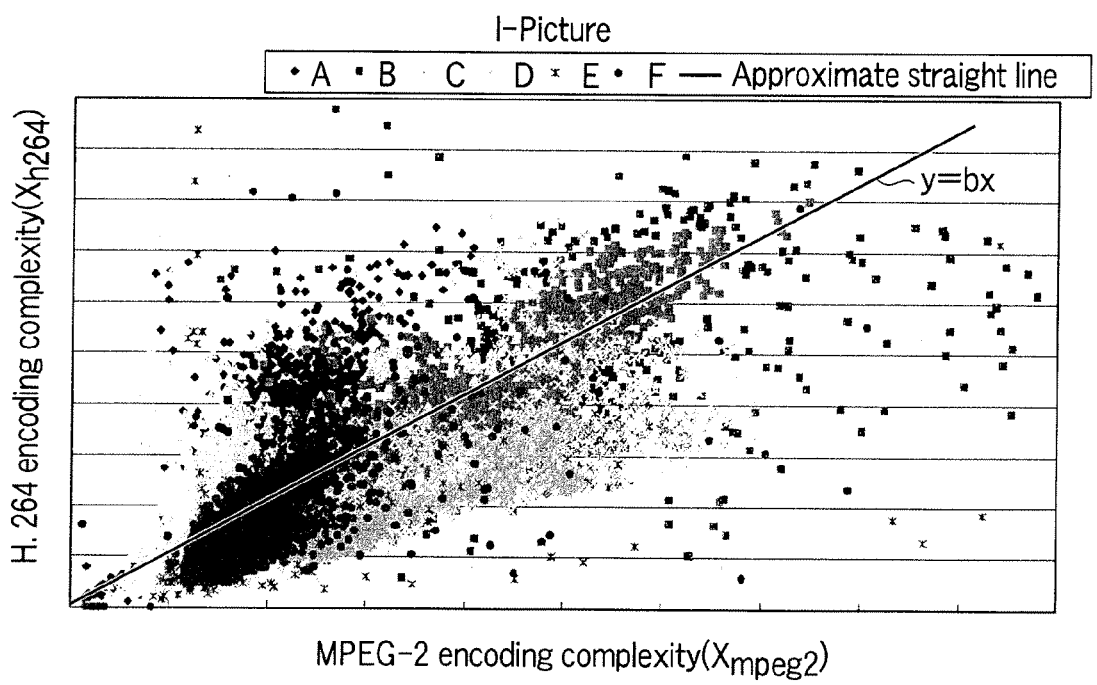
FIG. 7 is an exemplary graph explaining one example of a function used for an MPEG-2/H. 264 conversion of a P-picture in an encoding complexity conversion unit 103 in FIG. 2.
Figure 8:
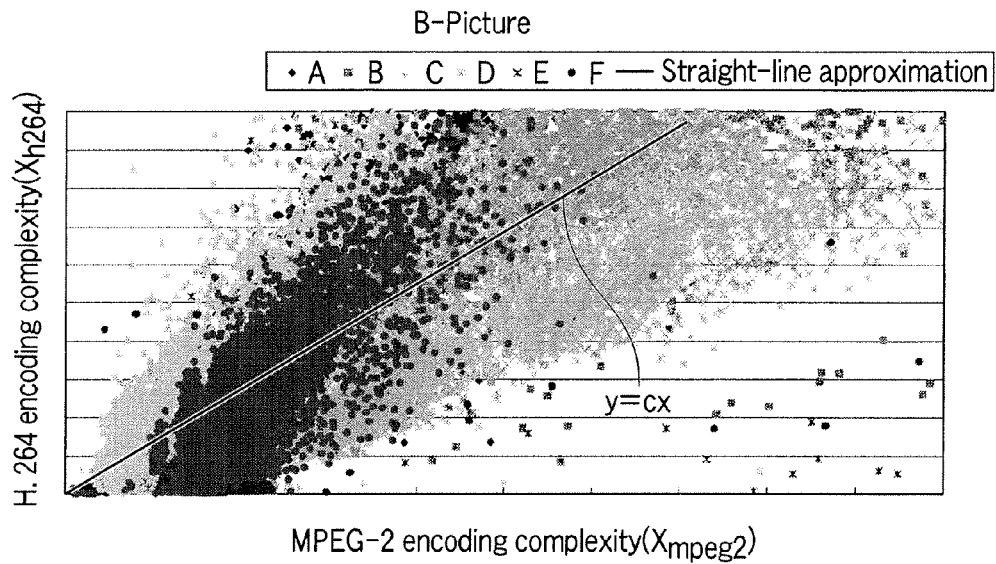
FIG. 8 is an exemplary graph explaining one example of a function used for an MPEG-2/H. 264 conversion of a B-picture in an encoding complexity conversion unit 103 in FIG. 2.

In the examples in FIG. 6 to FIG. 8, A to F indicate different sequences. Even if the sequences are different, the relation between the actual measured encoding complexity (Xmpeg2) before conversion and the predicted encoding complexity (Xh. 264) after conversion can be represented by substantially the same linear function.

FIG. 5 is further explained using the following variables.

F(t): t-th frame of the input image stream x(t): MPEG-2 encoding complexity corresponding to F(t)

X(t): Encoding complexity corresponding to F(t) and obtained by transcoding into the H. 264 (H.264 complexity)

p(t): MPEG-2 picture type corresponding to F(t); p(t)=(I, P, B)

After the predicted encoding complexity (Xh. 264) is buffered, bits allocated to each GOP (or a predetermined encoding target section) in the sequence needed to encode a moving image at a predetermined bit rate is calculated in the allocated bits per GOP calculation unit 105 in FIG. 2 (ST14).

In this bits allocated calculation processing, bits (Sall) provided to all the frames in the sequence are first calculated, and bits (Sgop) allocated to each GOP (or a predetermined encoding target section) in the sequence is then calculated, and further, allocated bits for each picture in the GOP is calculated. First, bits allocated to all the untranscoded frames are provided by Equation 2.

$$Sall = Bitrate \times M / FrameRate \qquad \text{(Equation 2)}$$

wherein FrameRate indicates a frame rate, and M indicates the total number of frames in the sequence.

Then, the bits Sall provided by Equation 2 is allocated to each GOP (or a predetermined encoding target section). Here, the sum (ΣX) of the encoding complexities in the frames of each GOP is calculated, and this sum is used for proportional distribution. That is, bits (SNth_gop) provided to an N-th GOP (or an N-th predetermined encoding target section) is provided by Equation 3 using the sum "~Xgop" of the encoding complexities in V frames which are all the frames in the GOP ("~" is placed on the top of "X" in the equation, but is indicated as "~X" in the explanations in the specification).

$$S_{Nth\_gop} = S_{all} \times \frac{\tilde{X}_{gop}}{\sum_{k=0}^{M-1} \tilde{X}(k)}$$

$$= S_{all} \times \frac{\sum_{j=0}^{V-1} \tilde{X}(t+j)}{\sum_{k=0}^{M-1} \tilde{X}(k)}$$

(Equation 3)

The bits (SNth_gop, N=1, 2, . . . ) in each GOP (or a predetermined encoding target section) calculated by Equation 3 is saved in the buffer 106 in FIG. 2 (ST15). The bits saved is used to perform encoding processing in transcoding (ST16). In this encoding processing (ST16), the MPEG-2 input streams are transcoded into H. 264/MPEG-4 AVC output streams frame by frame using allocated bits for each GOP saved in the buffer 106. This processing is repeated until the last frame in the sequence is transcoded.

That is, the first frame in the sequence is first decoded (MPEG-2 decoding) (ST17). If the frame decoded in ST17 is the first frame in the encoding target GOP (or a predetermined encoding target section) (yes in ST18), the allocated bits for the encoding target GOP is read from the buffer 106 in FIG. 2 (ST19). If the frame decoded in ST17 is not the first frame in the encoding target GOP (no in ST18), the reading processing in ST19 is skipped.

Then, bits per picture is allocated to the frame decoded in ST17 (ST20). Now, if the frame decoded in ST17 is located in the N-th GOP (or an N-th predetermined encoding target section) (corresponding to a k-th frame in the sequence), bits T(k) allocated in ST20 is obtained from Equation 4 using the bits (SNth_gop) allocated to the N-th GOP read in ST19 (or the N-th predetermined encoding target section) and using the H. 264/MPEG-4 AVC actual measurement encoding complexity (Xh. 264=Xi, Xp, Xb) calculated in ST25 described later.

$$T(k) = \begin{cases} \dfrac{S_{Nth\_gop\_remain}}{1 + \dfrac{N_p X_p}{X_i K_p} + \dfrac{N_b X_b}{X_i K_b}} & \text{if } p(k) = I \\[2ex] \dfrac{S_{Nth\_gop\_remain}}{N_p + \dfrac{N_b K_p X_b}{K_b X_p}} & \text{if } p(k) = P \\[2ex] \dfrac{S_{Nth\_gop\_remain}}{N_p + \dfrac{N_p K_b X_p}{K_p X_b}} & \text{if } p(k) = B \end{cases}$$

(Equation 4)

wherein Kp, Kb indicates a constant which defines the weight for the allocated bits to each picture. Xi, Xp, Xb indicate the H. 264/MPEG-4 AVC encoding complexities in the respective picture types for which transcoding has just finished. SNth_gop_remain indicates the difference between the allocated bits (obtained in ST14) in the GOP (or the predetermined encoding target section) and the num of bits generated in the frame in the GOP (or the predetermined encoding target section) for which encoding has been finished. Moreover, Np, Nb indicates the number of P-pictures, B-pictures which have not yet been encoded in the GOP (or the predetermined encoding target section). In the processing in ST20, the allocated bits per picture T(k) obtained from Equation 4 is temporarily stored in the allocated bits per picture calculation unit 107 in FIG. 2.

After the bits allocation per picture (ST20) is finished, a quantization scale is determined (ST21). This determination is carried out in the quantization scale determining unit 108 in FIG. 2. In the processing in ST21, a quantization scale (Q(k)) for a transcoding target image is calculated by Equation 5 using predicted encoding complexity "~X(k)" obtained from the encoding complexity conversion unit 103 in FIG. 2 and using the allocated bits per picture T(k) obtained from the allocated bits per picture calculation unit 107 in FIG. 2. Here, Equation 5 which is a modification of Equation 1 is used to determine a quantization parameter.

$$Q(k) = \left(\frac{S(k)}{\tilde{X}(k)}\right)^{-g_i}$$

(Equation 5)

Once the quantization scale (Q(k)) is determined, encoding for one frame is carried out in a format compliant with the H. 264/MPEG-4 AVC on the basis of this quantization scale (ST22), and a stream of the encoded image transcoded into the H. 264/MPEG-4 AVC is output.

Encoded information (a quantization scale, generated bits and a picture type for each frame) is extracted from the header of the H. 264/MPEG-4 AVC output stream transcoded as mentioned above (ST24), and actual measurement encoding complexity for the output stream is calculated in the same way as in the processing in ST12 (using Equation 1) (ST25). The calculated actual measurement encoding complexity is temporarily stored in the buffer 113 in FIG. 2.

The above-described processing (processing in ST17 to ST25) is repeated for all frames in the target GOP (or the predetermined encoding target section) (a loop for no in ST23). In this case, the "past encoding complexity for the same picture type" temporarily stored in the buffer 113 is used in the future encoding (ST22). That is, in contrast with the bits allocation on a GOP basis (or on the basis of a predetermined encoding target section) (ST14), the past encoding complexity (Xh. 264) of the H. 264/MPEG-4 AVC output stream for the same picture type (e.g., the I-picture) can be deemed the present encoding complexity for the frame to easily allocate bits for the picture. This "deemed bits allocation" enables quick encoding (transcoding) even if the picture types of the MPEG-2 and the H. 264/AVC are different.

After the processing in ST16 is finished for all the frames (yes in ST23), the processing in FIG. 5 ends. Here, the encoding complexities for the frames corresponding to the transcoded output images are stored in the buffer 113 for the frames (e.g., 15 frames) corresponding to at least one GOP (or at least one predetermined encoding target section). Data for the actual measurement encoding complexities of the transcoded output streams stored in the buffer 113 is properly referred to in the subsequent processing.

Figure 9:
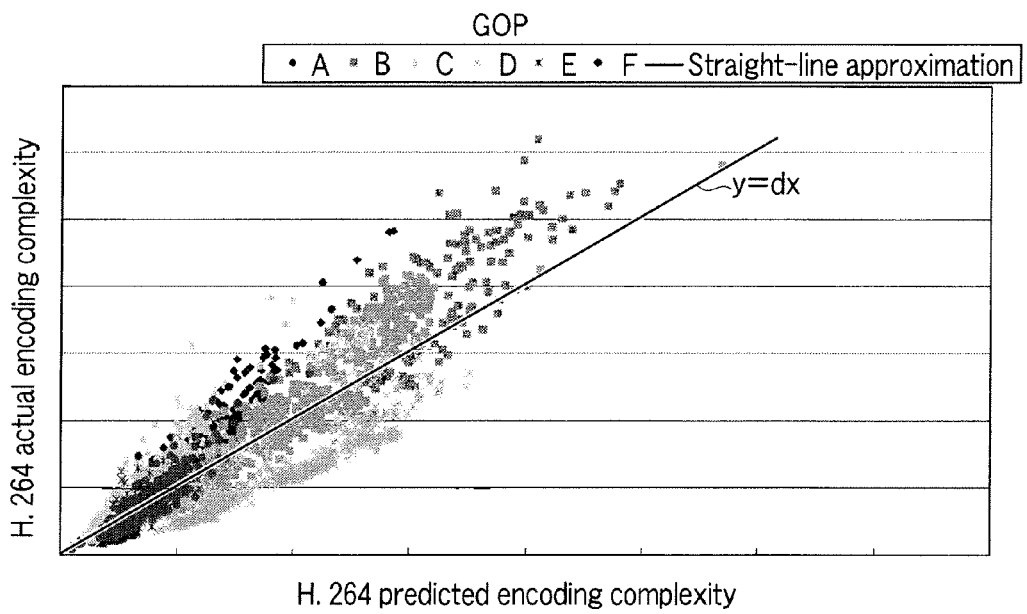
FIG. 9 is an exemplary graph explaining one example of the relation between predicted encoding complexity and actual measurement encoding complexity of the H. 264/MPEG-4 AVC on a GOP basis.

FIG. 9 illustrates the relation between the predicted encoding complexity and actual measurement encoding complexity of the H. 264/MPEG-4 AVC on a GOP basis. This relation is roughly represented by a direct (or linear) function (y=dx). This proves the propriety of using the result of the conversion by the encoding complexity conversion unit 103 in FIG. 2 or the result of the predicted encoding complexity calculation in ST13 in FIG. 5 as the "encoding complexity used in actual transcoding".

Figures 10, 11:
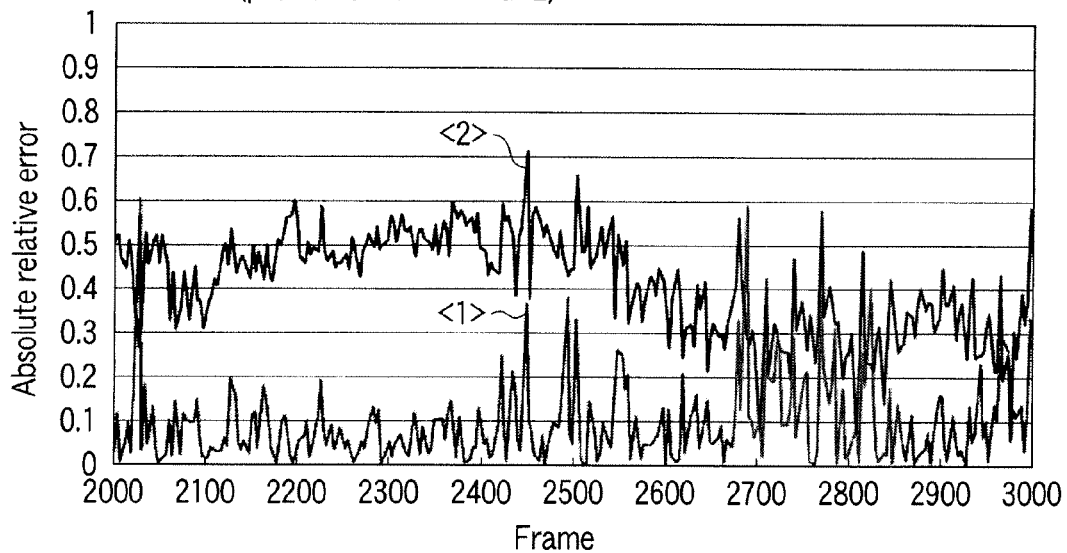
FIG. 10 is an exemplary graph explaining an example of prediction results of encoding complexity used to allocate bits on a picture basis.
FIG. 11 is an exemplary table illustrating correlation coefficients of actual measurements and predicted values of H. 264 encoding complexity on a picture basis and on a GOP basis.

FIG. 10 is an exemplary graph explaining an example of prediction results of encoding complexity used to allocate bits on a picture basis. This graph illustrates the result of comparison between the absolute relative errors of the actual measurement encoding complexity and the predicted encoding complexity by showing separate cases: the case (graph <1>) where the encoding complexity used to allocate bits on a picture basis is predicted from the preceding (or adjacent) transcoding result (H. 264 encoding result), and the case (graph <2>) where the encoding complexity is predicted from the MPEG-2 of the input stream. Here, the absolute relative errors of the actual measurement encoding complexity and the predicted encoding complexity are represented by "|predicted value−actual measurement|/actual measurement".

FIG. 10 shows that the absolute relative error is much smaller in the case (graph <1>) where the encoding complexity is predicted from the preceding (or adjacent) transcoding result (stored in the buffer 113 in FIG. 2) than in the case (graph <2>) where the encoding complexity is predicted from the MPEG-2 of the input stream. This proves the propriety of the fact that the "result of the calculation by the encoding complexity calculation unit 112" stored in the buffer 113 in FIG. 2 is regarded as the "encoding complexity used for the transcoding of the frame in the GOP (or the predetermined encoding target section)".

FIG. 11 illustrates correlation coefficients of actual measurements and predicted values of the H.264 encoding complexity on a picture basis and on a GOP basis (or on the basis of the predetermined encoding target section). It is apparent from this illustration that there is a relatively high correlativity between the actual measurement and the predicted value of the H. 264 encoding complexity in each of the cases of the I-picture, the P-picture, the B-picture and GOP (or the predetermined encoding target section).

<Modifications>

(01) The linear function is used for each picture type to calculate the H. 264/MPEG-4 AVC complexity from the MPEG-2 encoding complexity in the examples described above. However, this is not necessarily a limitation. Various conversion functions can be applied in accordance with the compression format of the input stream and the compression format of the output stream.

(02) The MPEG-2 is used for the input and the H. 264/MPEG-4 AVC is used for the output in the examples described above. However, this is not necessarily a limitation. For example, the encoding complexity conversion of this application can be applied to the case where an input stream in a DV format used in, for example, a digital video camera is transcoded into an output stream of VC-1 used in, for example, a personal computer.

(03) The quantization scale is calculated as in Equation 5 in the examples described above. However, "the difference between predicted generated bits and actual measurement generated bits" may be fed back to the quantization scale determining unit 108 during the transcoding of each frame to change the quantization scale in accordance with this difference.

Effects of the Embodiment

In comparison with the case where the bits are allocated in view of the bits variation alone, the following effects can be obtained.

(11) The H. 264/MPEG-4 AVC encoding complexity which is the output bit stream is predicted from the MPEG-2 encoding complexity which is the input bit stream, so that adaptive bits allocation can be achieved throughout the sequence without encoding on a constant quantization scale. Thus, even if the bit rate of the output is lower than the bit rate of the input, deterioration in the image quality can be prevented.

(12) The H. 264/MPEG-4 AVC encoding complexity predicted from the MPEG-2 encoding complexity is used for the bits allocation on a GOP basis (or on the basis of a predetermined encoding target section), and a past encoding result is used for the bits allocation on a picture basis. Consequently, adaptive bits allocation can be achieved throughout the sequence, and even if the bit rate of the output is lower than the bit rate of the input, deterioration in the image quality can be prevented.

(13) The above-mentioned technique is used for the bits allocation on a GOP basis (or on the basis of a predetermined encoding target section) and the bits allocation on a picture basis, so that the picture types of the input stream and the output stream do not have to completely correspond to each other.

SUMMARY OF THE EMBODIMENT

1. The MPEG-2 header information is read to acquire a quantization scale, generated bits and a picture type for each frame. Using such information, the MPEG-2 encoding complexity for each frame (encoding complexity=generated bits× quantization scale g: g is a value determined for each picture type) is calculated. Then, a linear function prepared for each picture type is used to calculate H. 264 encoding complexity for each frame.

2. For encoding, the H. 264 encoding complexity calculated by the above-mentioned technique is used to allocate bits to all the GOPs in the sequence (or all the predetermined encoding target sections). Then, the bits allocated to each GOP (or the predetermined encoding target section) are allocated to each picture in the GOP. At this moment, in contrast with the bits allocation on a GOP basis (or on the basis of a predetermined encoding target section), the bits is allocated by regarding the past encoding complexity of the same picture type as the encoding complexity of the target encoding frame. This enables encoding even if the picture types of the MPEG-2 and the H. 264/AVC are different.

In other words, a certain function is used to predict the encoding complexity of the output image stream from the encoding complexity of the input image stream. The predicted encoding complexity is used to allocate bits to all the GOPs in a sequence. The bits allocated to each GOP are allocated to a picture in the GOP. For this allocation, the past encoding result of the same picture type is used.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A moving image/picture encoding apparatus configured to transcode an input stream into an output stream, the input stream being a fixed-rate MPEG-2 stream whose bit-rate is controlled to be constant by changing a quantization parameter, the apparatus comprising:
   an information acquisition module configured to acquire information on a quantization scale, a num of generated bits and a picture type for each frame from the input stream;
   an encoding complexity calculation module configured to calculate, for each of the frames, encoding complexity represented in a form of $S \times Q^{gi}$ by using the information acquired in the information acquisition module, where Q denotes an average quantization scale of the frame, S denotes a num of bits of the frame, gi denotes a fixed value determined for each picture type and being independent of image as long as the picture type is same, postfix i of the fixed value gi indicates the picture type, and X denotes a product;
   an encoding complexity conversion module configured to convert the encoding complexity calculated by the encoding complexity calculation module into encoding complexity of the output stream by using a linear function prepared for each of the picture types and indicating a relation between the encoding complexity of the input stream and the encoding complexity of the output stream, where the encoding complexity of the input stream is a function of the fixed value gi being independent of the image as long as the picture type is same, and the linear function shows a linearity within a changeable range of the encoding complexity of the input stream; and
   a transcode module configured to re-encode the input stream into the output stream by using the encoding complexity of the output stream converted by the encoding complexity conversion module,
   wherein the re-encoding by the transcode module is performed for each of the frames by using the linear function prepared for each of the picture types, and
   the transcode module includes a num of bits allocation module configured to allocate a num of bits to be used in the re-encoding to each of group of pictures contained in a sequence of the input stream.

2. The apparatus of claim 1, wherein the transcode module includes a picture num of bits allocation module configured to allocate a bit or bits allocated to the group of pictures to each of I, B, and P pictures in the group of pictures.

3. The apparatus of claim 2, wherein the transcode module includes a buffer configured to store the calculated encoding complexity, the calculated encoding complexity stored in the buffer being available for a subsequent determination of the quantization scale, and the bit or bits is/are configured to be allocated to the picture of the I, B, and P pictures, with a condition that past or previous encoding complexity of the output stream for the same picture type is regarded as the present or current encoding complexity of a target frame.

4. The apparatus of claim 3 wherein the transcode module includes
   a decoding module configured to decode the input stream,
   an encoding module configured to re-encode the stream decoded by the decoding module so as to convert the stream into the output stream, and
   a quantization scale determining module configured to determine a quantization scale in the encoding module from the bit or bits allocated to the picture.

5. A moving image/picture encoding method for transcoding an input stream into an output stream, the input stream being a fixed-rate MPEG-2 stream whose bit-rate is controlled to be constant by changing a quantization parameter, the method comprising:
   reading, by an information acquisition module, MPEG header information from the input stream to acquire information on a quantization scale, a num of generated bits and a picture type for each frame;
   calculating, by an encoding complexity calculation module for each of the frames, encoding complexity represented in a form of $S \times C^{gi}$ by using the acquired information, where Q denotes an average quantization scale of the frame, S denotes a num of bits of the frame, gi denotes a fixed value determined for each picture type and being independent of image as long as the picture type is same, postfix i of the fixed value gi indicates the picture type, and X denotes a product;
   converting, by an encoding complexity conversion module, the calculated encoding complexity into encoding complexity of the output stream by using a linear function prepared for each of the picture types and indicating a relation between the encoding complexity of the input stream and the encoding complexity of the output stream, where the encoding complexity of the input stream is a function of the fixed value gi being independent of the image as long as the picture type is same, and the linear function shows a linearity within a changeable range of the encoding complexity of the input stream; and
   re-encoding, by a transcode module, the input stream into the output stream by using the converted encoding complexity of the output stream, wherein
   the re-encoding is performed for each of the frames by using the linear function prepared for each of the picture types, and
   a num of bits allocation module is configured to allocate a num of bits to be used in the re-encoding to each of group of pictures contained in a sequence of the input stream.

* * * * *